(12) United States Patent
Williams et al.

(10) Patent No.: US 10,102,508 B1
(45) Date of Patent: Oct. 16, 2018

(54) CHECK PRINTING INSTRUCTIONS IN ACH TRANSACTIONS

(71) Applicant: Yodlee, Inc., Redwood City, CA (US)

(72) Inventors: Gary Williams, Union City, CA (US); Peter Hazlehurst, Foster City, CA (US); Jayasree Iyer, Bangalore (IN); Julieta Abad, Morgan Hill, CA (US)

(73) Assignee: Yodlee, Inc., Redwood City, CA (US)

( * ) Notice: Subject to any disclaimer, the term of this patent is extended or adjusted under 35 U.S.C. 154(b) by 830 days.

(21) Appl. No.: 14/180,797

(22) Filed: Feb. 14, 2014

Related U.S. Application Data

(62) Division of application No. 12/727,187, filed on Mar. 18, 2010, now Pat. No. 8,655,783.

(60) Provisional application No. 61/162,630, filed on Mar. 23, 2009.

(51) Int. Cl.
*G06Q 40/00* (2012.01)
*G06Q 20/04* (2012.01)
*G06Q 20/02* (2012.01)

(52) U.S. Cl.
CPC ......... *G06Q 20/042* (2013.01); *G06Q 20/023* (2013.01)

(58) Field of Classification Search
CPC ...... G06Q 40/00; G06Q 20/10; G06Q 20/102; G06Q 20/1085; G06Q 20/40; G06Q 20/042
USPC .............................. 705/35, 39, 40, 43, 44, 45
See application file for complete search history.

(56) References Cited

U.S. PATENT DOCUMENTS

| | | | |
|---|---|---|---|
| 5,465,206 A * | 11/1995 | Hilt | G06Q 20/02 705/40 |
| 5,677,955 A | 10/1997 | Doggett et al. | |
| 5,893,080 A * | 4/1999 | McGurl | G06Q 20/02 235/379 |
| 6,173,272 B1 | 1/2001 | Thomas et al. | |
| 6,408,284 B1 * | 6/2002 | Hilt | G06Q 20/02 705/40 |
| 6,611,351 B1 | 8/2003 | Simonoff | |
| 7,113,925 B2 | 9/2006 | Waserstein et al. | |
| 7,124,113 B1 | 10/2006 | Fairclough et al. | |
| 7,366,695 B1 * | 4/2008 | Allen-Rouman | G06Q 20/02 705/39 |
| 7,389,913 B2 | 6/2008 | Starrs | |
| 8,165,958 B1 * | 4/2012 | McLaughlin | G06Q 20/10 705/39 |
| 8,275,702 B1 * | 9/2012 | Enriquez | G06Q 40/02 705/39 |
| 8,527,376 B1 | 9/2013 | Bueche, Jr. | |
| 8,655,783 B1 | 2/2014 | Williams et al. | |
| 2002/0032653 A1 * | 3/2002 | Schutzer | G06Q 20/04 705/40 |
| 2002/0120846 A1 * | 8/2002 | Stewart | G06Q 20/04 713/168 |

(Continued)

OTHER PUBLICATIONS

ASAP Payment Formats, 1998, all pages.

(Continued)

*Primary Examiner* — Lalita M Hamilton
(74) *Attorney, Agent, or Firm* — Fish & Richardson P.C.

(57) ABSTRACT

A computer-implemented method includes issuing a transaction on the Automated Clearing House (ACH) electronic network, the transaction including instructions for printing a check, receiving the transaction, and printing the check according to the instructions.

20 Claims, 5 Drawing Sheets

(56) References Cited

U.S. PATENT DOCUMENTS

| | | |
|---|---|---|
| 2002/0174334 A1 | 11/2002 | Meadow et al. |
| 2003/0055756 A1* | 3/2003 | Allan .................... G06Q 20/02 |
| | | 705/33 |
| 2003/0125969 A1 | 7/2003 | Kizer et al. |
| 2003/0208445 A1 | 11/2003 | Compiano |
| 2004/0064407 A1* | 4/2004 | Kight .................... G06Q 20/04 |
| | | 705/40 |
| 2004/0215560 A1* | 10/2004 | Amalraj ................. G06Q 20/04 |
| | | 705/40 |
| 2005/0131834 A1 | 6/2005 | Rodriguez et al. |
| 2006/0161501 A1* | 7/2006 | Waserstein ........... G06Q 20/042 |
| | | 705/65 |
| 2006/0191998 A1 | 8/2006 | Mueller et al. |
| 2006/0282381 A1 | 12/2006 | Richie |
| 2007/0198432 A1* | 8/2007 | Pitroda ................. G06Q 20/02 |
| | | 705/64 |
| 2007/0214078 A1* | 9/2007 | Coppinger ............. G06Q 20/10 |
| | | 705/39 |
| 2008/0040284 A1 | 2/2008 | Hazel et al. |
| 2008/0249931 A1* | 10/2008 | Gilder ................... G06Q 20/04 |
| | | 705/39 |
| 2008/0306839 A1 | 12/2008 | Starrs |
| 2009/0083189 A1 | 3/2009 | Bykov et al. |
| 2009/0164374 A1 | 6/2009 | Shastry |
| 2009/0182672 A1 | 7/2009 | Doyle |
| 2010/0161466 A1* | 6/2010 | Gilder ................... G06Q 20/04 |
| | | 705/34 |
| 2013/0144780 A1 | 6/2013 | Edmonds et al. |
| 2013/0275301 A1* | 10/2013 | Lehman ................ G06Q 20/04 |
| | | 705/42 |

OTHER PUBLICATIONS

Computer Dictionary, $5^{th}$ Edition, Microsoft Press, Redmond, WA, 2002.

Electronic Payments Review and Buyer's Guide, Understanding the ACH Network: An ACH Primer, 2002, all pages.

Paypal, Payflow ACH Payment Service Guide, 2009, Paypal, Inc., all pages.

* cited by examiner

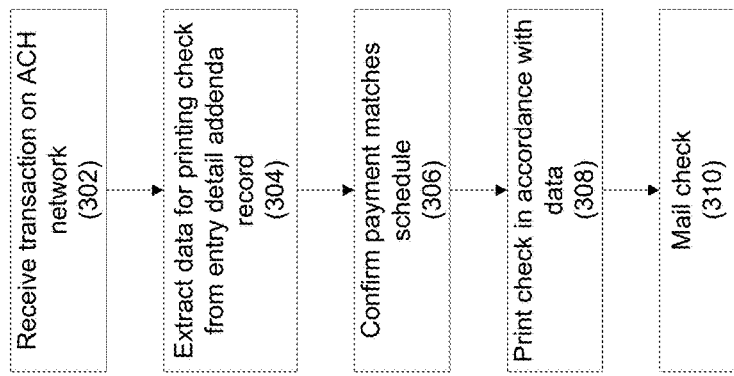
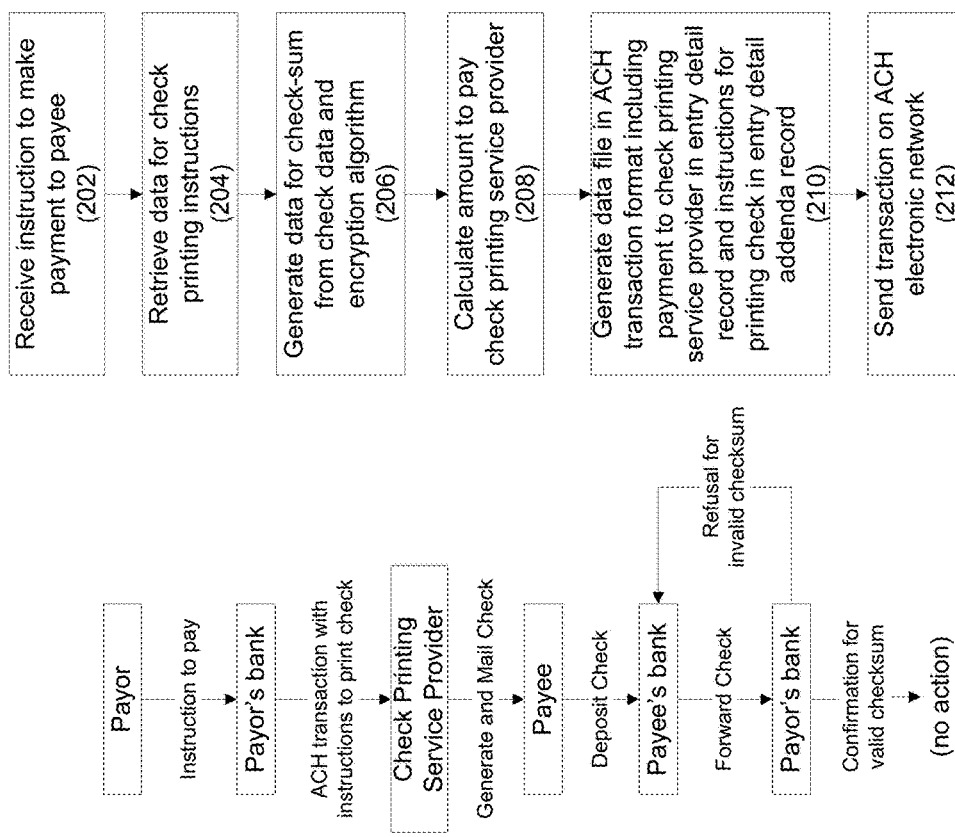

CHECK PRINTING INSTRUCTIONS IN ACH TRANSACTIONS

CROSS-REFERENCE TO RELATED APPLICATIONS

This application is a divisional of U.S. application Ser. No. 12/727,187, filed Mar. 18, 2010, which claims priority to U.S. Provisional Application Ser. No. 61/162,630, filed on Mar. 23, 2009, each of which is incorporated by reference.

BACKGROUND

This disclosure relates generally to bill payment.

In a conventional payment by personal check, the payor writes and delivers a check drawn on the payor's account at the payor's bank to the payee, and the payee deposits the check with the payee's bank. The payee's bank forwards the check to the payor's bank, and after the check clearing cycle the payee's account is credited and the payor's account is debited. In a conventional payment by direct deposit, also termed a giro, the payor instructs the payor's bank to transfer funds directly to the payee's account at the payee's bank.

There are two general models of electronic billing. In the direct biller model, a consumer makes a payment to a biller, e.g., a utility company, at the biller's website, e.g., by a credit card payment or an electronic debit. In the bank aggregator model, the customer uses his or her bank's website (or an aggregator or consolidator website), to authorize payment to a biller. Assuming that the biller can receive electronic payment, then the bank aggregator model operates similarly to the direct deposit model, in that on instruction by the customer to make a payment, the customer's bank can transfer funds electronically directly to the biller's bank. However, where the biller is not prepared to receive electronic payments, the customer's bank can usually generate and mail a paper check.

Printing of the paper check is conventionally done either by the customer's bank, or outsourced to a check printing service provider. Where the printing is outsourced to a check printing service provider, the customer's bank assembles data for multiple transactions (e.g., payee name and address and amount of check) into an electronic file, e.g., a spreadsheet, and transmits the file to the check printing service provider by electronic mail over the Internet, by virtual private network over the Internet, or by a modem-to-modem connection. For example, such a file might be assembled and transmitted at the end of each business day. The files are typically encrypted, e.g., with Pretty Good Privacy (PGP), when transmitted to the check printing service provider.

SUMMARY

In one aspect, a computer-implemented method includes issuing a transaction on the Automated Clearing House (ACH) electronic network, the transaction including instructions for printing a check.

In another aspect, a computer-implemented method includes receiving a transaction on the Automated Clearing House (ACH) electronic network, the transaction including instructions for printing a check, and printing the check according to the instructions.

Implementations can include one or more of the following features. Authorization can be received in a computer from a payor to make a payment to a payee drawn on an account of the payor, and the instructions are for printing the check payable to the payee. The transaction can indicate a receiver other than the payee. The transaction can includes instructions to credit an account of the receiver. The instructions can include data identifying at least a payee, an amount to pay the payee, a routing number and an account number. The instructions can include data identifying an address of the payee. The data can be encrypted. The instructions can include a cryptographically generated digital signature. The instructions can be included in an entry detail addenda record of the transaction. The transaction can be a single transaction and can includes instructions for printing a plurality of checks payable to a single payee, the plurality of checks drawn on a plurality of accounts of different payors. The instructions for printing a check can include instructions for printing a bank check or vendor check. The transaction can be warehoused. The instructions can indicate printing of the check at least four days after issuance of the transaction. The check can be mailed. The check is printed payable to a payee according to the instructions.

In other aspects, a computer program product, tangibly stored on machine readable medium, includes instructions operable to cause a processor to perform the methods above. In other aspects, a system is configured to perform the methods above.

Implementations can realize one or more of the following advantages. Instructions for printing a check can be sent on a secure network, without using the Internet. Payment to the check printing service provider for printing and mailing a check can be made at the same time that instructions for printing the check are provided. Instructions can be provided for printing a single check or a batch of checks for a single payee. Checks can be printed and delivered to a payee more quickly. Check printing can be distributed to different printing stations based on the ZIP code of the destination of the payee.

The details of one or more embodiments are set forth in the accompanying drawings and the description below. Other features, objects, and advantages will be apparent from the description and drawings, and from the claims.

DESCRIPTION OF DRAWINGS

FIG. 1 illustrates an electronic bill payment process in which a paper check is generated and mailed to the payee.

FIG. 2 illustrates a method performed when generating an ACH transaction.

FIG. 3 illustrates a method performed when generating the paper check.

DETAILED DESCRIPTION

Figure 4:
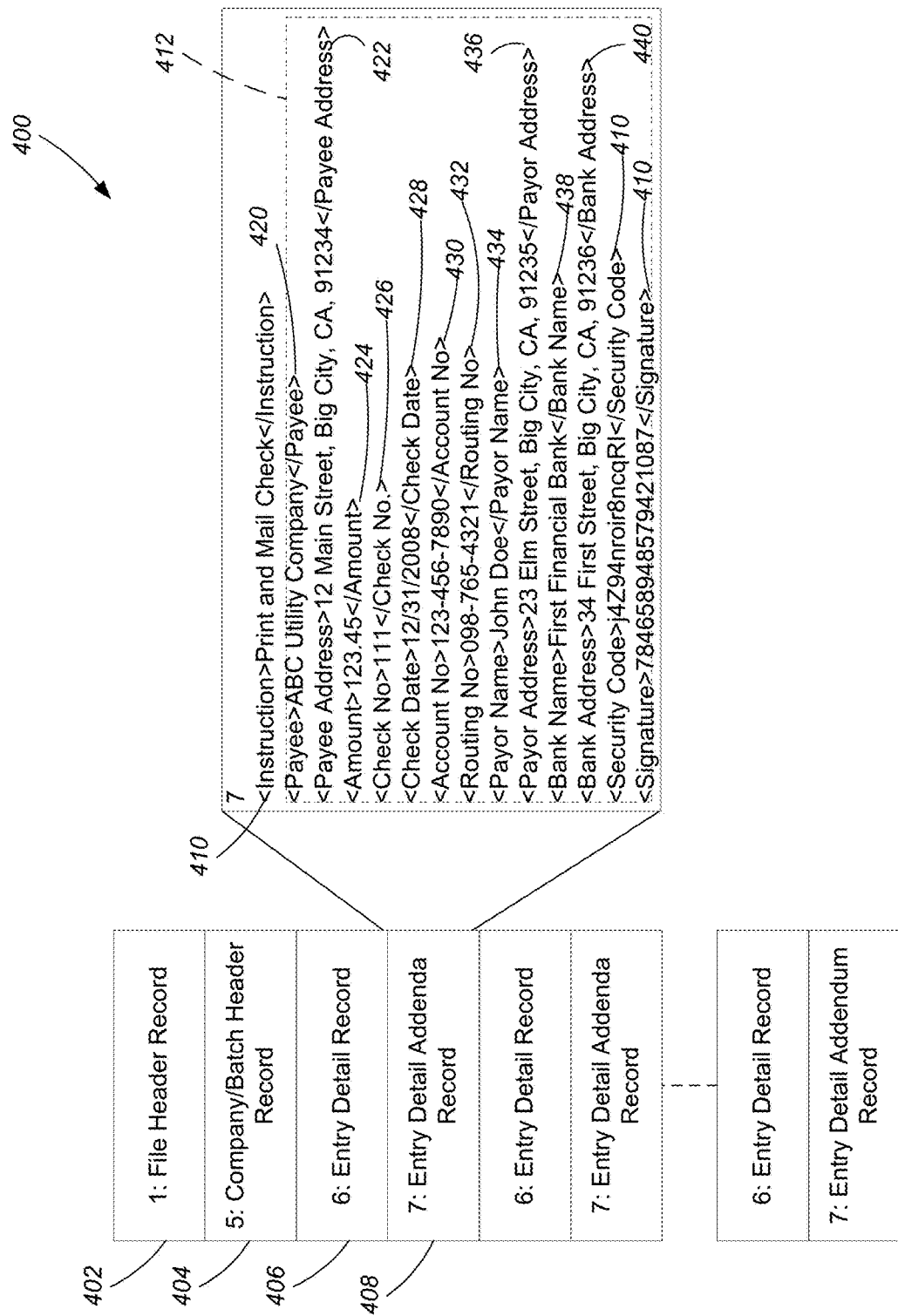
FIG. 4 illustrates a data format of an ACH transaction including an instruction to print a paper check.

In general, an instruction to print a check can be sent to a check printing service provider as part of an Automated Clearing House (ACH) transaction. The fee for the check printing, e.g., printing and mailing costs, can be paid in the ACH transaction. More particularly, a customer's bank (or authorized bill pay provider) can make an ACH payment to a check printing service provider, and embedded in the ACH transaction is data sufficient for the check printing service provider to determine that an instruction to print a check is present, as well as all information necessary for printing the check.

Referring to FIG. 1, an electronic bill payment process begins with a customer (the payor) instructing the customer's bank to make a payment to the payee. Typically, the customer will use an electronic bill payment feature of an online banking or account aggregation website to make the instruction. The online banking website can be operated by the customer's bank (or an authorized bill pay provider). That is, the customer will use a web browser application running on a computer, e.g., a general purpose programmable digital computer, to access a server operated by the customer's bank to receive and view a web page generated by the server. Typically, a verification process will be required to ensure the identity of the customer, e.g., a password as part of the logon to the online banking website. Alternatively, the customer can make the instruction with more conventional techniques, e.g., by telephone or in person at the customer's bank, with the instruction entered into the customer bank computer by a customer bank employee. The instruction includes at least the identity of the payee and the amount of payment.

Referring to FIGS. 1 and 2, on receipt of the instruction (step 202), the computer of the customer's bank (or authorized bill pay provider) collects the data needed for printing of a check (step 204). Some of the data can be provided in the instruction, e.g., the identities of the payee and payor and the amount of payment. Some of the data can be retrieved from a database, e.g., by finding records associated with the identified payee or payor and that indicate default selections. For example, the customer's bank can maintain a database that stores account numbers for a payor and identifies one of the account numbers as a default account number to use for bill payment. As another example, the customer's bank can maintain a database that stores addresses of payees.

Optionally, a security code is generated by the customer bank computer (step 206). The security code can be a multi-character alphanumeric code, e.g., a multi-digit numeric code, that enables the customer's bank (or potentially another check clearing entity) to later confirm that no modifications have been made to the check. The security code can be an encrypted checksum generated using one or more data fields (other than the security feature itself) printed on the check, and one or more keys. In other words, the key and the data fields to be printed on the check are used as inputs to an encryption algorithm, e.g., a cryptographic hash function, which generates an output value, e.g., a hash value of fixed-size. The security code is described in greater detail in U.S. Provisional Patent Application No. 61/014,399, which is incorporated by reference in its entirety.

A check processing fee to pay the check printing service provider is calculated by the customer bank computer according to a schedule agreed upon by the check printing service provider and the customer bank (step 208). The check processing fee can include an amount to cover the cost of printing the check, an amount to cover mailing of the check (which can depend on whether the check can be mailed as a postcard or in an envelope, and if in an envelope then whether the check will be mailed in a batch with other checks), and an additional transaction charge, as payment to the check printing service provider.

A data file is generated by the customer bank computer in ACH transaction format (step 210). In particular, as discussed further below, the payment to the check printing service provider can be included in an entry detail record, and the instructions to the check printing service provider to print a check drawn on the customer's account can be included in an entry detail addenda record. The data file, including the instructions to print a check, is sent on the ACH network to provide an ACH transaction (step 212). Thus, the check processing payment can be made to the check printing service provider as part of the same ACH transaction that sends the instructions to print the check.

The data file can contain check processing payments to the check printing service provider for instructions sent on a previous day to print a check. For example, the check processing payment can be made at the expected delivery date of the check to the payee or at the expected earliest date for the check to clear.

It is possible to warehouse transactions in the ACH file for future dated events, for example for recurring transactions, e.g., tax payments or fees for a health club, that occur regularly. Traditional ACH warehousing rules would apply in this scenario and are well documented with the difference between posting and effective dates.

The check printing service can be implemented with different types of checks. A default service involves printing a check that is drawn on the customer's account (typically referred to as consumer draft). In consumer draft mode, a check is printed where the source of funds and hence the clearing process are the customer's own account at their financial institution. Consumer draft has an advantage that no funds leave the customer's account until the check is cleared, but the disadvantage that the account may overdraw at the time of presentment of the check. Two other modes of check delivery are "bank draft", in which the check is drawn from an account owned by the financial institution that is offering the bill paying service, and "vendor draft", in which the check is drawn from an account owned by the bill paying service provider. The type of check can be indicated in the ACH transaction, e.g., in an entry detail addenda record.

The customer's bank will also debit the customer's account for the amount of the payment to the payee. In a "good funds" model, the customer's account is debited at or prior to the time the check is generated, e.g., at the time the ACH transaction is sent, to ensure that funds are available to cover the payment. For a bank draft or vendor draft, the customer's account is debited at or sufficiently prior to the time the check is generated to ensure the check processor service has time to clear the debit first against the customer's source of funds.

In contrast, in an "at risk" model for a bank draft or vendor draft, the customer's account is debited (and the financial institution or bill paying service provider account credited) at the time the check printed. In an "at risk" model for a consumer draft, the customer's account is debited at the time the check returned by the payee's bank and cleared. For additional customized processing, the customer's bank can also debit one of its own accounts for the amount of the check processing payment to the check printing service provider.

For bank draft or vendor draft checks, the instructions can be sent several days in advance of the date that the check is to be printed. For example, if "T" is the expected delivery date, then the ACH file can be send on T-4. As another example the ACH file can be sent at T-7 (or T-6) if the transaction will be sent if doing good funds, in order to give the processor time to clear the debit first against the customer's source of funds.

Referring to FIGS. 1 and 3, when the check printing service provider receives the ACH transaction (step 302), a check printing service provider computer extracts the check printing instructions (step 304). Optionally, the check printing service provider computer can determine whether the processing payment matches the agreed upon schedule (step 306). If the processing payment is insufficient, the check printing request could be refused and returned to the payor's bank. Assuming that the processing payment is sufficient, the check printing service provider prints a hardcopy check, drawn on the customer's account at the customer's bank and payable to the payee, in accordance with the instructions (step 308), and mails the printed check to payee (step 310).

The check printing service provider can also credit its own account for the amount of the check processing payment.

FIG. 4 illustrates the data structure of an ACH transaction 400, including a file header record 402, a company/batch header record 404, one or more entry detail records 406, and one or more detail addenda records 408. The ACH transaction 400 can include other records, e.g., batch control or file control records. It may be noted that, subject to the identity of the parties in the transaction and amount of payment, and the presence of the check printing instructions in the detail addenda records 408, the records of the ACH transaction and the ACH transaction itself can otherwise be formatted in an "ACH compliant" manner (i.e., in accordance with ACH rules provided by the National Automated Clearing House Association in affect on the filing date of this description).

The file header record 402, with Record Type "1", indicates the entity sending the ACH transaction, i.e., the customer's bank or authorized bill pay provider (sometimes termed the "originator" in ACH terminology).

The company/batch header record 404, with Record Type "5", defines where the ACH transaction is to be electronically routed (sometimes termed the "receiving depository financial institution" in ACH terminology); it is the equivalent of a "To" field in an electronic mail message. The company/batch header record 404 can indicate that the ACH transaction is to be routed to the check printing service provider's bank, and the check printing service provider's bank can then forward the data in the ACH transaction to the check printing service provider. Where the check printing service provider is itself a Receiving Depository Financial Institution (RDFI), the company/batch header record 404 can indicate that the ACH transaction is to be routed directly to the check printing service provider.

Entry detail record 406, with Record Type "6", identifies the payee of the ACH transaction (sometimes termed the "receiver" in ACH terminology) and the amount of the payment. This is not the payee and amount of the check that will be printed, but rather the check printing service provider and check processing fee.

Entry detail addenda record, with Record Type "7" is where the instructions to print the check are located. In conventional ACH transactions this field is optional, but as described herein, the entry detail addenda record includes a code 410 indicating that the ACH transaction includes check printing instructions, and includes the data 412 necessary for the check printing service provider to print the check payable to the payee and mail the check to the payee.

In particular, the entry detail addenda record can include a payee name 420, a payee address 422, a check amount 424, a check number 426, check date 428, an account number 430, and a routing transit number (also termed an ABA number) 432. The entry detail addenda record can also include a payor name 434, a payor address 436, and a payor bank name 438 and a bank address 440. A security code 450 to be printed on the check can also be placed in the entry detail addenda record, as can a digital signature 460.

At least some of the entry detail addenda record, e.g., all of data 412 in the entry detail addenda record (optionally including the code 410 indicating that this is a check printing instruction, but excluding any record formatting characters), can be encrypted. For example, the data in the entry detail addenda record can be encrypted by the customer bank computer prior to sending the ACH transaction with a public key encryption scheme, e.g., Pretty Good Privacy (PGP), with the customer's bank (or authorized bill pay provider) holding the public key and the check printing service provider holding the private key. The data in the entry detail addenda record is decrypted when received by the check printing service provider computer.

Alternatively or in addition, the entry detail addenda record can include a digital signature, again with public key encryption scheme, e.g., Pretty Good Privacy (PGP), with the customer's bank (or authorized bill pay provider) holding the public key and the check printing service provider holding the private key. That is, the customer bank computer can add the digital signature 460 using the public key prior to sending the ACH transaction. Similarly, the check printing service provider computer can verify the authenticity of the digital signature with the private key. If the check printing service provider computer cannot authenticate the digital signature, then the check printing service provider can refuse to print the check.

The data in the entry detail addenda record can be formatted (before encryption or after decryption if applicable) in Extensible Markup Language (XML).

Where the check printing instructions do not fit within a single entry detail addenda record, multiple entry detail addenda records can be used.

Once the check printing service provider receives an ACH transaction, a computer of the check printing service provider can evaluate the entry detail addenda record of each ACH transaction to determine whether it includes the code indicating that the ACH transaction includes check printing instructions. If ACH transaction includes check printing instructions, the check printing service provider computer decrypts the data in the entry detail addenda record (if necessary), extracts the data, verifies the digital signature (if necessary), and prints the check according to the extracted data. In some implementations, only ACH transactions from certain parties, e.g., a customer's bank or authorized bill pay provider from whom the check printing service provider expects to receive check printing instructions, as indicated in the file header record, are evaluated.

Figure 5:
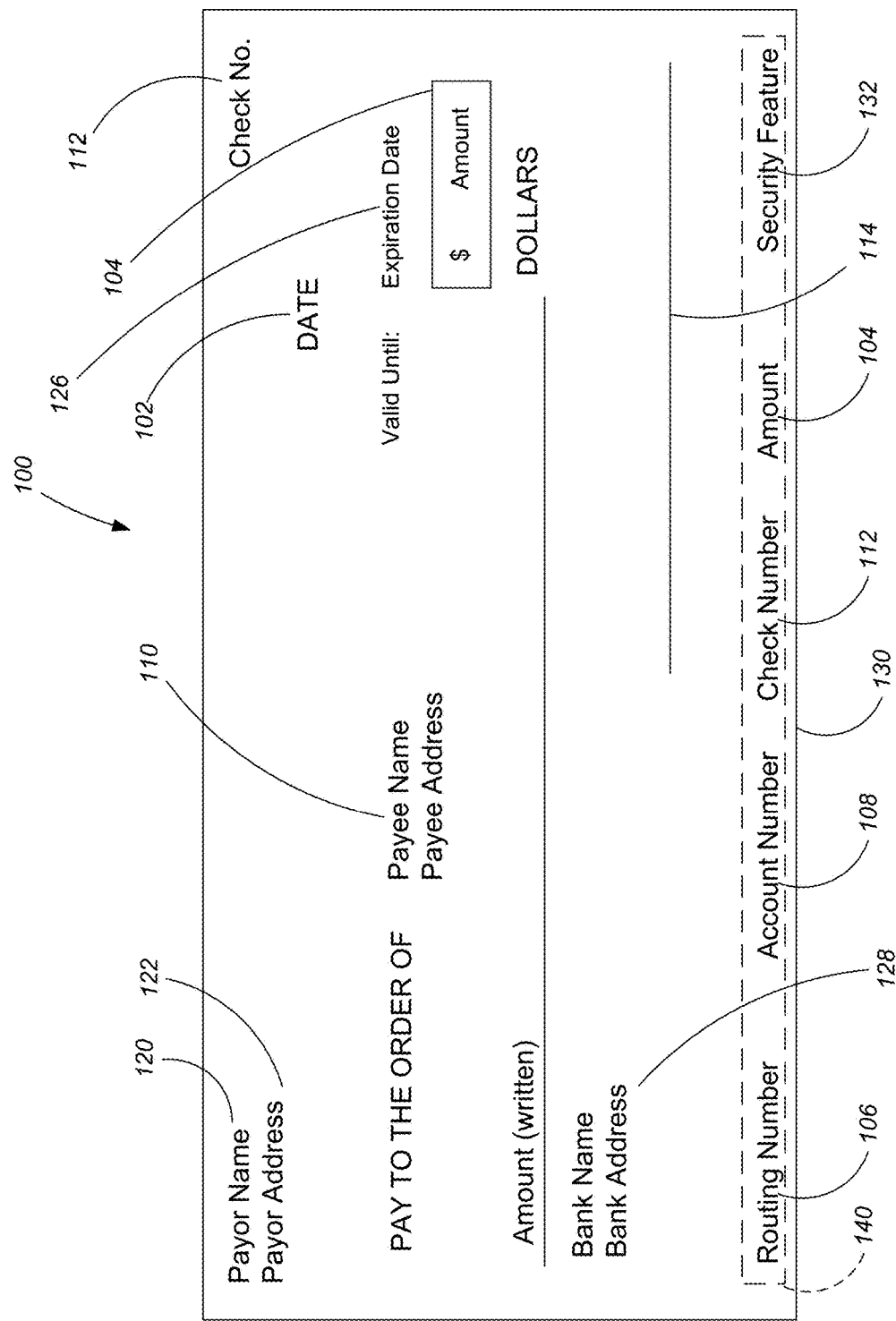
FIG. 5 is a schematic illustration of a check.

Referring to FIG. 5, the check 100 is printed by the check printing service provider with the conventional obligatory data fields using values taken from the entry detail addenda record, including a date 102, amount 104, routing transit number (also termed an ABA number) 106, account number 108, payee name 110 and check number 112, and other conventional check features, such as a signature line 114. The check can also include other conventional fields, such payor name 120, payor address 122, payee address 124, expiration date 126, and bank name and bank address 128.

Some data is printed along the bottom edge 130 of the check 100 in magnetic ink character recognition (MICR) format with MICR ink. This MICR data includes the traditional MICR information, such as the routing transit number 106, account number 108 and check number 112, as well as the amount 104 (potentially omitting separators) and the security feature 132. The fields can be delimited by separators, e.g., colon marks.

Figure 6:
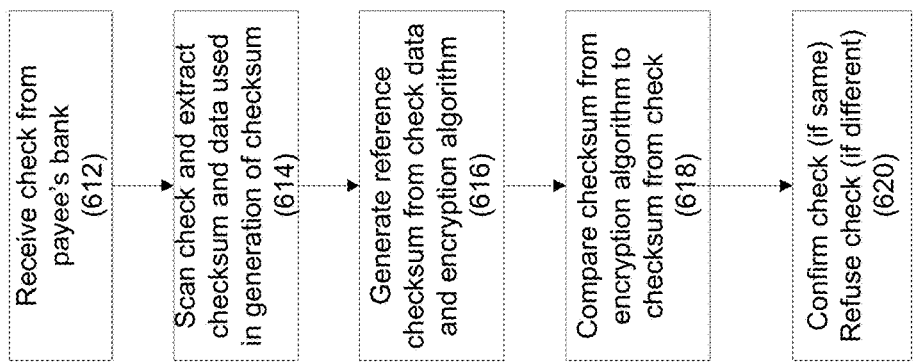
FIG. 6 illustrates a method performed when the issuing bank receives the paper check.
Figure 7:
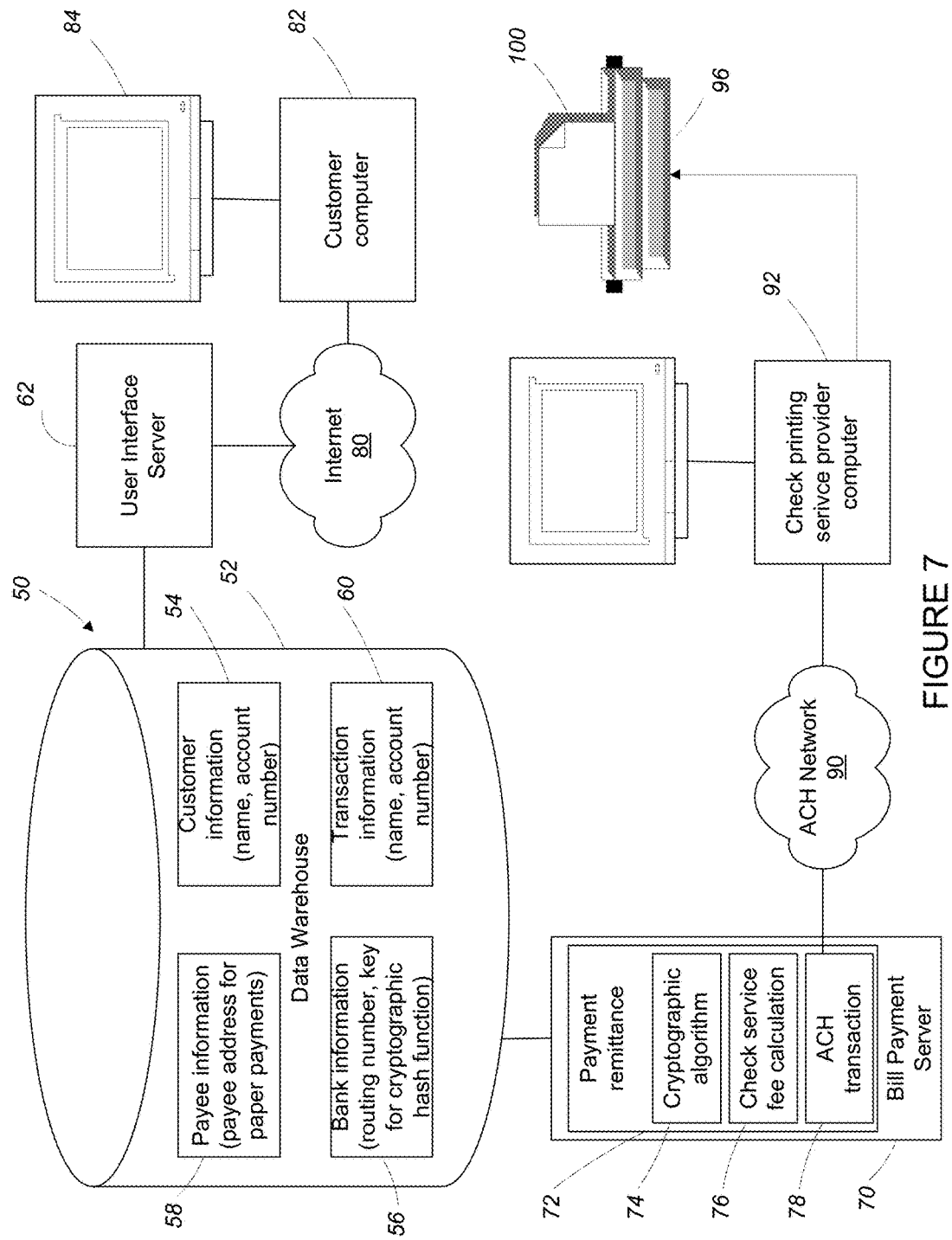
FIG. 7 illustrates computers of the a customer, a customer's bank and a check printing service provider connected by networks.

Returning to FIGS. 1 and 6, the payee receives the check and deposits the check with the payee's bank. Typically the payee's bank will credit the payee's account, but place the deposit on hold. The payee's bank then forwards the check to the customer's bank (typically through a check sorting process performed by an intermediary bank, e.g., the Federal Reserve, a correspondent bank, or a clearinghouse corporation). The customer's bank receives the check, and decides whether to clear or refuse the check.

Once the customer's bank receives the check (step 612), it extracts the data from the check (step 614), e.g., by the automated scanning of the MICR data, or by optical character recognition (OCR) of other data fields on the check. The extracted data includes at least the checksum and the data used as an input to the cryptographic hash function. The extracted data, along with the same key, is input into the same cryptographic hash function as was used to generate the checksum to generate a reference checksum (step 616). The output, i.e., the reference checksum, is compared to the checksum scanned from the check (step 618). Based on the result of the comparison, the check is either refused or confirmed (step 620).

A system 50 operated by the customer's bank or account aggregator is illustrated in FIG. 5. The system 50 includes a data warehouse 52, e.g., a database, such as a massive distributed relational database. The data warehouse stores customer data 54, bank data 56, and payee data 58, and transaction data 60 in electronic form. Customer data 54 can include the customer's name, contact information, e.g., the customer's address, telephone number, and email address, and account information, including the customer's account numbers (and banks for those accounts if the system is operated by an account aggregator) and account balances. Customer data 54 can also include the customer's password or PIN, and optionally can include a key for the cryptographic algorithm as well. The bank data 56 includes the bank's name and address, ABA or routing number, and one or more keys for the encryption algorithm. The payee data 58 includes at least the payee's address. If the payee desires to receive electronic payment, then the payee data 58 could also identify the bank and account number to receive payment. However, as this disclosure concerns the generation of paper checks, it is assumed that either electronic payment is absent or the payee has opted to receive paper checks. The transaction data 60 includes data for requested bill payment transactions, e.g., the identity of customer, the identity of payee, the amount of payment, and the account from which payment will be made.

The system 50 includes a user interface server 62, e.g., a web server, to generate a user interface for the customer to interact with the bank or account aggregator in order to issue instructions to pay bills, review account balances, and the like. The server 62 is connected by a network 80, e.g., the Internet, to the customer's computer 82, which runs a client application, e.g., a web browser, to display the web pages generated by the web server 62 on a display 84, and otherwise communicate with the server 62. The server 62 can generate queries to and receive data from the data warehouse 52 to generate the web pages. The server 62 can also add payment instructions to the transactions data 60 in response to communications from the customer's computer 82.

A bill payment server 70 can run a payment remittance application 72 to manage the payments instructed by the customers. For example, after a record has been added to the transactions data 60, the payment remittance program 72 queries the data warehouse 52 for the necessary information to print a check, e.g., the date, amount, routing transit number, account number, payee name, payee address, and check number, as well as the key for a cryptographic algorithm 74. The needed data, including the key, is passed to the cryptographic hash function 74, which generates the checksum as discussed above. A check printing service fee is calculated by a service fee calculation function 76. Then the data needed for assembling the ACH transaction, including the data needed for the instructions for printing the check, including the checksum, as well as the data needed for payment of printing service fee to the check printing service provider, is passed to an ACH transaction function 78. The payment remittance program 70 can also be responsible for debiting the appropriate customer account, and for debiting the bank account for the printing service fee.

The ACH transaction function 78 of the payment remittance application 72 generates the ACH transaction in the format discussed above, and sends the ACH transaction on the ACH network 90 to the check printing service provider computer 92. The check printing service provider computer 92 determines whether to print the check, as discussed above, and runs a check printing engine, which controls a MICR printer 96 to print the check 100 (and other components that might be printed simultaneously, as discussed below). The check printing engine can also generate an image of the check 100 which can be sent by the Internet 80 to be stored in the data warehouse 52.

The processes and logic flows described in this specification can be performed by one or more programmable processors executing one or more computer programs to perform functions by operating on input data and generating output. The computer programs can be implemented as computer programs products, i.e., one or more computer programs tangibly embodied in a machine readable storage device, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network. The processes and logic flows can also be performed by, and apparatus can also be implemented as, special purpose logic circuitry, e.g., an FPGA (field programmable gate array) or an ASIC (application specific integrated circuit).

A number of embodiments have been described. Nevertheless, it will be understood that various modifications may be made without departing from the spirit and scope of the invention.

The check could be a bearer check or a certified check, and the concepts discussed can be applicable to other negotiable instruments. The security code could be generated and added by the check printing service provider rather than the customer bank.

Accordingly, other embodiments are within the scope of the following claims.

What is claimed is:

1. A computer-implemented method, comprising:
receiving, by a computer of a payor's bank or bill pay provider, instructions from a payor to make a payment for a particular amount to a payee;
generating, by the computer of the payor's bank or bill pay provider, data including (i) payment information from the payor to the payee and (ii) the instructions for printing a check payable to the payee; and
providing to a computer system of a receiver other than the payee, by the computer of the payor's bank or bill pay provider, the data in a transaction on the Automated Clearing House (ACH) electronic network to cause the receiver to print a check payable to the payee.

2. The method of claim 1, wherein the instructions to make the payment are instructions to make a payment drawn on an account of the payor.

3. The method of claim 2, wherein the instructions include data identifying at least a payee, an amount to pay the payee, a routing number and an account number.

4. The method of claim 3, wherein the instructions include data identifying an address of the payee.

5. The method of claim 3, wherein the data is encrypted.

6. The method of claim 1, wherein the instructions include a cryptographically generated digital signature.

7. The method of claim 1, wherein the transaction is a single transaction and includes instructions for printing a plurality of checks payable to a single payee, the plurality of checks drawn on a plurality of accounts of different payors.

8. The method of claim 1, wherein the instructions for printing a check include instructions for printing a bank check or vendor check.

9. The method of claim 1, wherein issuing a transaction includes issuing an instruction for a warehoused transaction.

10. The method of claim 1, wherein the instructions for printing a check include instructions for printing a check at least four days after issuance of the transaction.

11. A computer program product, tangibly stored on a non-transitory machine readable medium, the product comprising instructions operable to cause a processor to:
issue a transaction on the Automated Clearing House (ACH) electronic network, the transaction including instructions for printing a check;
receive, by a computer of a payor's bank or bill pay provider, instructions from a payor to make a payment for a particular amount to a payee;
generate, by the computer of the payor's bank or bill pay provider, data including (i) payment information from the payor to the payee and (ii) the instructions for printing a check payable to the payee; and
provide to a computer system of a receiver other than the payee, by the computer of the payor's bank or bill pay provider, the data in a transaction on the ACH electronic network to cause the receiver to print a check payable to the payee.

12. The computer program product of claim 11, wherein the instructions to make the payment are instructions to make a payment drawn on an account of the payor.

13. The computer program product of claim 12, wherein the instructions to make the payment include data identifying at least a payee, an amount to pay the payee, a routing number and an account number.

14. The computer program product of claim 13, wherein the instructions to make the payment include data identifying an address of the payee.

15. The computer program product of claim 13, wherein the data is encrypted.

16. The computer program product of claim 11, wherein the instructions to make the payment include a cryptographically generated digital signature.

17. The computer program product of claim 11, wherein the transaction is a single transaction and includes instructions for printing a plurality of checks payable to a single payee, the plurality of checks drawn on a plurality of accounts of different payors.

18. The computer program product of claim 11, wherein the instructions for printing a check include instructions for printing a bank check or vendor check.

19. The computer program product of claim 11, wherein issuing a transaction includes issuing an instruction for a warehoused transaction.

20. The computer program product of claim 11, wherein the instructions for printing a check include instructions for printing a check at least four days after issuance of the transaction.

* * * * *